UNITED STATES PATENT OFFICE.

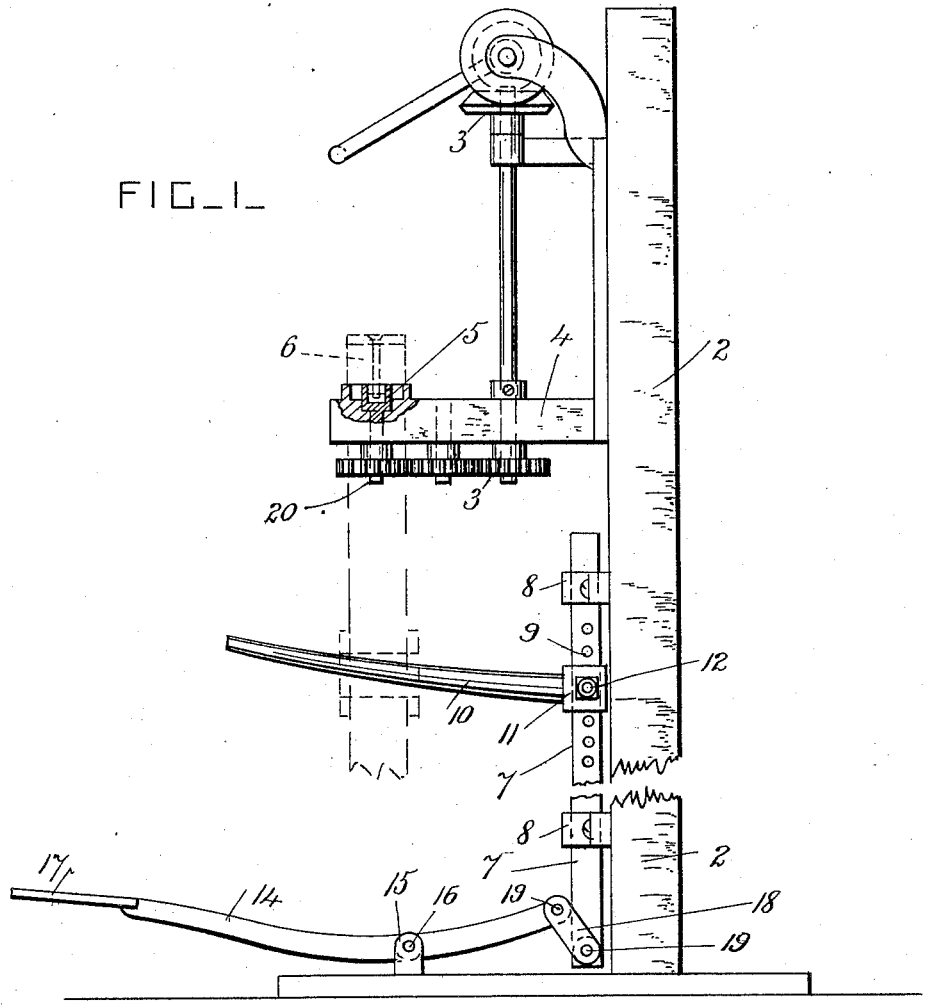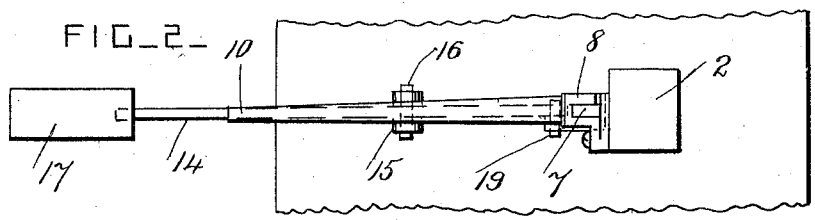

FREDERICK W. STANGE, OF CLYMAN, WISCONSIN.

WHEEL-SUPPORT.

1,044,282.  Specification of Letters Patent.  Patented Nov. 12, 1912.

Application filed July 11, 1912. Serial No. 708,863.

*To all whom it may concern:*

Be it known that I, FREDERICK W. STANGE, a citizen of the United States, residing at Clyman, in the county of Dodge and State of Wisconsin, have invented certain new and useful Improvements in Wheel-Supports; and I do hereby declare the following to be a full, clear, and exact description of the invention, such as will enable others skilled in the art to which it appertains to make and use the same.

This invention relates to wheel supports used in connection with tire bolting machines and other similar machines; and it consists of a supporting arm and treadle mechanism as hereinafter fully described and claimed.

In the drawings, Figure 1 is a side view of portions of a tire bolting machine provided with a wheel support according to this invention. Fig. 2 is a plan view of the wheel support.

The tire bolting machine, or other similar machine, bolt clipper or bolt wrench, is provided with a vertical supporting pillar 2, and 3 are portions of the driving mechanism of the machine carried by a frame 4 which is secured to the pillar 2. This mechanism is provided with a wrench 5 for engaging with the nuts of the tire bolts, and 6 indicates a portion of a wheel, in dotted lines, placed in position to have a nut screwed off or on by the tire bolt machine. The wrench 5 is carried by a vertical operating spindle 20 which is journaled in the front end portion of the frame 4.

A vertical bar 7 is provided and is arranged to slide in guides 8 which are secured to the pillar 2. The upper end portion of the bar 7 has a series of holes 9 in it, and 10 is an upwardly and forwardly inclined arm which is provided with a socket 11 and a bolt 12 for securing it to the bar 7. The bolt 12 engages with any of the holes 9, and the socket is slid upon the bar to adapt it to the size of the wheel to be operated on. The arm 10 projects laterally of the bar 7 to a point beyond the spindle 20 and the frame 4, and it is preferably curved, but the curvature is not an essential feature.

A foot lever 14 is pivoted to a stationary bracket 15 by a pin 16, and has a foot plate 17 at its front end. The bracket 15 is bolted to the floor or to any convenient support. The rear end of the foot lever is pivotally connected with the lower end portion of the bar 7 by a link 18 and pins 19.

The hub of the wheel is slipped loosely over the inclined arm, and the treadle is depressed so that the rim of the wheel is raised above the level of the wrench 5. The wheel is then slid rearwardly and tilted forwardly, and is lowered a little so that the nut on the tire bolt engages with the wrench. The nut is then screwed off or on in the usual manner. After each nut has been operated on, the wheel is raised upwardly and is tilted and slid forwardly, and is turned around so that the next tire bolt is brought into a vertical position opposite the wrench, and the wheel is then slid and tilted rearwardly to its original position. The shape of the arm permits the wheel to slide and tilt forwardly with very little exertion on the part of the operator, and so that the spokes of the wheel may be placed in a position to clear the machine when the wheel is partially revolved to bring another tire bolt to a vertical position.

This treadle mechanism obviates the necessity of lifting the wheel onto and off the machine by hand to bring the tire bolts to a vertical position one after the other.

What I claim is:

1. The combination, with a machine of the character described provided with a vertical operating spindle, of a vertical bar arranged to the rear of and below the said spindle, a guide for the said bar, an upwardly inclined arm projecting laterally of the said bar under the said spindle and adapted to support a wheel, and means for raising the said bar and arm.

2. The combination, with a machine of the character described provided with a vertical operating spindle, of a vertical bar arranged to the rear of and below the said spindle, a guide for the said bar, an upwardly inclined arm projecting laterally of the said bar under the said spindle and adapted to support a wheel, means for securing the said arm to the said bar at different levels below the spindle, and means for raising the said bar and arm.

In testimony whereof I have affixed my signature in the presence of two witnesses.

FREDERICK W. STANGE.

Witnesses:
EMIL KRESSINE,
LOUIS KOHLHOFF.